United States Patent Office 3,496,222
Patented Feb. 17, 1970

3,496,222
DIACETYLATED CYCLIC DIMER OF ETHANE-1-HYDROXY - 1,1 - DIPHOSPHONIC ACID AND SALTS THEREOF
Oscar T. Quimby, Colerain Township, Hamilton County, Ohio, and James B. Prentice, Batesville, Ind., assignors to The Procter & Gamble Company, Cincinnati, Ohio, a corporation of Ohio
No Drawing. Filed Dec. 28, 1967, Ser. No. 694,106
Int. Cl. C07c *105/02*
U.S. Cl. 260—488                       2 Claims

ABSTRACT OF THE DISCLOSURE

Compounds having a formula:

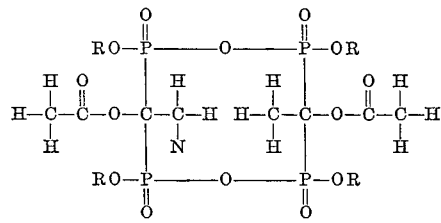

in which R is hydrogen, sodium, potassium, lithium, or ammonium. The compounds are of the class of diacetylated cyclic dimers of ethane-1-hydroxy-1,1-diphosphonic acid, useful as sequestering agents and detergency builders.

BACKGROUND OF THE INVENTION

Field of the invention

The compounds of the present invention are condensates of ethane - 1 - acetoxy - 1,1 - diphosphonic acid joined by anhydride bonds.

Description of the prior art

Ethane-1-hydroxy-1,1-diphosphonic acid has the following formula:

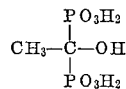

This compound is described as a valuable detergency builder in U.S. Patent 3,159,581 issued to Francis L. Diehl Dec. 1, 1964.

Ethane-1-hydroxy-1,1-diphosphonic acid is a known compound, a method for its preparation having been published in 1897 by Hans von Baeyer and K. A. Hofmann (Berichte, 30, 1973–1978). The method described therein is essentially a reaction between glacial acetic acid and phosphorus trichloride. This reaction proceeds through the formation of acetyl chloride and phosphorous acid as intermediates.

A similar reaction system is described in an article authored by Benjamin T. Brooks, titled "The Action of Phosphorus Trichloride on Organic Acids; Monoacetyl Phosphorous Acid," published in the Journal of the American Chemical Society, vol. 34, 492–499 (1912).

A process for preparing ethane-1-hydroxy-1,1-diphosphonate is described and claimed in copending patent application Ser. No. 444,046, filed Mar. 30, 1965 by Jimmie K. Dyer, which comprises reacting phosphorus trichloride and acetic acid in the presence of a lower aliphatic amine solvent (e.g., tributylamine).

Another process for preparing ethane-1-hydroxy-1,1-diphosphonic acid is described in copending patent application Ser. No. 455,567, filed May 13, 1965 by Oscar T. Quimby, which describes a reaction between phosphorus acid, acetic anhydride, and acetyl chloride.

Ethane-1-hydroxy-1,1-diphosphonic acid can also be prepared by the reaction between acetic acid and an anhydride of phosphorous acid to form a reaction mixture containing phosphite intermediate compounds, heating the mixture to convert the phosphite intermediate compounds to compounds containing carbon atoms bonded to phosphorus atoms, and then hydrolyzing to form ethane-1-hydroxy-1,1-diphosphonic acid. Such a process is described and claimed in copending patent application Ser. No. 553,648, filed May 31, 1966 by Oscar T. Quimby and James B. Prentice.

SUMMARY OF THE INVENTION AND DECRIPTION IF PREFERRED EMBODIMENTS

It has now been discovered that a compound having the following formula

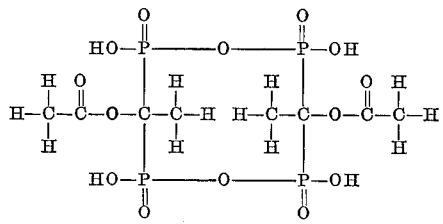

is prepared as a solid crystalline product by dissolving ethane-1-hydroxy-1,1-diphosphonic acid, ethane-1-hydroxy-1,1-diphosphonic acid monohydrate, or ethane-1-acetoxy-1.1-diphosphonic acid, in acetic acid, and then adding a volume of acetic anhydride equal to the volume of acetic acid used. The acetic anhydride is added rapidly with good stirring. The diacetylated cylic dimer of ethane-1-hydroxy-1,1-diphosphonic acid forms and precipitates quickly, e.g., within a few seconds forming a slurry. The slurry is then cooled to room temperature and digested for about an hour. The solids are recovered by filtration, washed with ethyl ether and dried under dry nitrogen.

The solid diacetylated cyclic dimer of ethane-1-hydroxy-1,1-diphosphonic acid usually crystallizes with one mole of acetic anhydride of solvation; however, the amount of solvation which remains in the product is governed by the extent of ether washing and length of drying time.

By the reaction of the present invention, the bridge carbon, i.e., the carbon joining two phosphonate groups, is acetylated, and two P—O—P bonds are closed, and the resulting diacetylated dimer of ethane-1-hydroxy-1,1-diphosphonic acid is crystallized. This entire process is complete within a few seconds after addition of the acetic anhydride. The speed with which the P—O—P bonds are formed in a reaction system of this type containing high anhydrizing power is a significant and surprising aspect of the present invention.

The present invention is illustrated by a following examples.

EXAMPLE I

Diacetylated cyclic dimer of
ethane-1-hydroxy-1,1-diphosphonic acid

A clear reaction solution was prepared by dissolving 35 gms. of ethane-1-hydroxy-1,1-diphosphonic acid monohydrate (.15 mole) in 400 cc. of acetic acid by warming to 65° C. The solution was cooled to 55° C. and 400 cc. of acetic anhydride was added rapidly.

A white crystalline precipitate formed within about 5 seconds. The slurry was cooled to room temperature over a half-hour period, and the solids were removed by filtration and washed free of mother liquor by washing twice with 100 cc. of ethyl ether. The sample was then dried under a dry nitrogen atmosphere to prevent the pick up of atmospheric moisture. The yield was 33 gms. of diacetylated cyclic dimer of ethane-1-hydroxy-1,1-diphosphonic acid. This was about a 90% yield based on the phosphorus.

EXAMPLE II

Tetrasodium salt of diacetylated cyclic dimer of ethane-1-hydroxy-1,1-diphosphonic acid 70 gms. of a diacetylated cyclic dimer of ethane-1-hydroxy-1,1-diphosphonic acid prepared according to Example I was added cautiously to a solution of 53.3 gms. of sodium bicarbonate in 480 cc. of water with vigorous stirring forming a clear solution (final molar ratio about one sodium per phosphorus). The clear solution was outgassed to remove residual carbon dioxide, then 2 liters of methanol was added. A slightly turbid solution formed which was digested for one hour at room temperature and filtered. The 5.6 gms. of solids which were recovered in the cut was predominantly sodium salt of acetylated ethane-1-hydroxy-1,1-diphosphonic acid. The clear filtrate was diluted with 1.1 liter of acetone over a 3 hour period and filtered. The product was a gummy solid. Five additional crystallizations were carried out each time removing a small "first cut" of solids (acetylated ethane-1-hydroxy-1,1-diphosphonate impurity). The final yield was 48 gms. of tetrasodium salt diacetylated cyclic dimer of ethane-1-hydroxy-1,1 - diphosphonic acid, containing less than 1% acetylated ethane-1 - hydroxy-1,1-diphosphonic acid impurity (by acid-base titration).

*Analysis.*—Theory: C/P, 2.0; C, 17.5; P, 22.6; H, 2.2; IV*a*, 17.5; molecular weight, 548. Found: C/P, 2.0; C, 17.5; P, 22.6; H, 2.3; Na, 17.1; molecular weight, 583.

In Example II, the sodium bicarbonate can be replaced with equivalent amounts of potassium bicarbonate, lithium bicarbonate, or ammonium carbonate and the corresponding salts are obtained in exactly the same manner.

The NMR spectra of this compound exhibits a multiplet (greater than 5 peaks) at delta=—5.5 p.p.m. by $^{31}$P—MR, and by H$^1$MR singlet at tau=7.33 p.p.m.

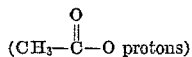
(CH$_3$—C—O protons)

and a multiplet (5 peaks) at tau=5.57 p.p.m.

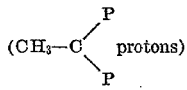
(CH$_3$—C protons)

Both the $^{31}$P and H$^1$MR spectra exhibit sharp singlets when the other is magnetically decoupled. The additional multiplicity for this compound could be due to hindered rotation. Hindered rotation in the ring structure of the molecule gives rise to five possible sterio-isomers.

Just as the diacetylated cyclic dimer of ethane-1-hydroxy-1,1-diphosphonic acid is rapidly formed in anhydrizing media, it is likewise decomposed quite rapidly in hydrolyzing media. Dissolving the diacetylated acid in water results in an aqueous solution of acetylated ethane-1-hydroxy-1,1-diphosphonic acid,

CH$_3$C(COCH$_3$)(PO$_3$H$_2$)$_2$ within a few minutes at room temperature. The structure of diacetylated cyclic dimers of ethane-1-hydroxy-1,1-diphosphonic acid can be preserved by dissolving the powdered acid cautiously in an aqueous solution which is buffered to about a neutral pH, such as, for example, with sodium bicarbonate. The structure is reasonably stable at this near neutral pH, and can be crystallized as the sodium salt. If a different salt is desired, the buffering agent can be appropriately selected such as lithium bicarbonate, ammonium bicarbonate, and the like.

The alkali metal salts, especially sodium and potassium salts of the diacetylated cyclic dimer of ethane-1-hydroxy-1,1-diphosphonic acid, are especially useful as sequestering agents and also as builders in detergent compositions. As a builder compound, the sodium and potassium salts are in a class with citrate compounds for this purpose. As builders, the compounds of the present invention can be used in admixture with detergent compounds selected from the group consisting of anionic, nonionic, ampholytic, cationic, and zwitterionic synthetic detergents.

Generally, the builders are used in the detergents in weight proportions of detergent to builder of about 3:1 to about 1:10. In complete detergent formulations containing the aforementioned detergent-builder mixtures there can also be used the usual types of additives such as alkaline materials, silicates, sulphates, germicides, suds builders or suppressers, dyes, perfumes, anti-redeposition agents, e.g., carboxymethylcellulose, and the like.

The builder compounds can be formed using the acid and neutralizing the solution to a pH of 8–12 with a base, e.g., sodium hydroxide.

The members of the new class of diacetylated cyclic dimers of ethane-1-hydroxy-1,1-diphosphonic acid are also useful as sequestering agents and in this respect, too, are in a class with the citrate compounds. In this useful application these compounds can be used to complex and sequester metal ions such as calcium, magnesium, iron, etc. Examples of such applications include softening of water and prevention and removal of scale deposits in boilers, oil wells and metal tubing used in connection therewith. Other useful applications are described in a text entitled "Organic Sequestering Agents," by Chabarek and Martell, published in 1959 by John Wiley and Sons.

What is claimed is:

1. Compounds having a formula

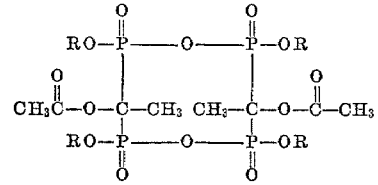

in which R is hydrogen, sodium, potassium, lithium, or ammonium.

2. Diacetylated cyclic dimers of ethane-1-hydroxy-1,1-diphosphonic acid having a formula

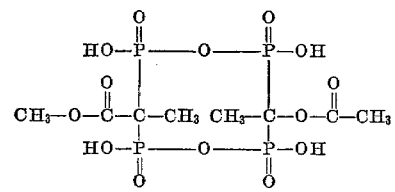

References Cited

UNITED STATES PATENTS

| | | | |
|---|---|---|---|
| 3,122,417 | 2/1964 | Blaser et al. | 260—502.4 |
| 3,202,579 | 8/1965 | Berth et al. | 260—502.4 |
| 3,214,454 | 10/1965 | Blaser et al. | 260—502.4 |
| 3,400,147 | 9/1968 | Rogovin et al. | 260—502.4 |

LORRAINE A. WEINBERGER, Primary Examiner

V. GARNER, Assistant Examiner

U.S. Cl. X.R.

252—82, 180; 260—502.4